(12) United States Patent
Menke et al.

(10) Patent No.: US 11,204,498 B2
(45) Date of Patent: Dec. 21, 2021

(54) OPTICAL ELEMENT WITH A FRESNEL STRUCTURE, AND DISPLAY DEVICE WITH SUCH AN OPTICAL ELEMENT

(71) Applicant: Carl Zeiss Smart Optics GmbH, Aalen (DE)

(72) Inventors: Christoph Menke, Oberkochen (DE); Eduard Schmidt, Oberkochen (DE); Wolfgang Singer, Aalen (DE); Norbert Kerwien, Moegglingen (DE)

(73) Assignee: tooz technologies GmbH, Aalen (DE)

( * ) Notice: Subject to any disclaimer, the term of this patent is extended or adjusted under 35 U.S.C. 154(b) by 102 days.

(21) Appl. No.: 14/907,523

(22) PCT Filed: Jul. 25, 2014

(86) PCT No.: PCT/EP2014/066111
§ 371 (c)(1),
(2) Date: Jan. 25, 2016

(87) PCT Pub. No.: WO2015/011287
PCT Pub. Date: Jan. 29, 2015

(65) Prior Publication Data
US 2016/0349512 A1    Dec. 1, 2016

(30) Foreign Application Priority Data
Jul. 26, 2013  (DE) .................... 10 2013 214 697.3

(51) Int. Cl.
*G02B 27/01* (2006.01)
*G02B 5/09* (2006.01)
(Continued)

(52) U.S. Cl.
CPC ........... *G02B 27/0172* (2013.01); *G02B 3/08* (2013.01); *G02B 5/09* (2013.01); *G02B 27/0012* (2013.01);
(Continued)

(58) Field of Classification Search
CPC .......... G02B 3/08; G02B 5/18; G02B 5/1852; G02B 5/1861; G02B 5/1866;
(Continued)

(56) References Cited

U.S. PATENT DOCUMENTS 8,467,132 B2 *  6/2013  Dobschal ................. G02B 3/08
                                                         345/7
2004/0257652 A1 * 12/2004  Peterson ............... G03B 21/625
                                                       359/460
(Continued)

FOREIGN PATENT DOCUMENTS

DE    102005022636 A1    11/2006
DE    102009010538 A1    8/2010
(Continued)

OTHER PUBLICATIONS http://www-math.mit.edu/~djk/calculus_beginners/chapter09/section03.html (Year: 2012).*
(Continued)

*Primary Examiner* — Travis S Fissel
(74) *Attorney, Agent, or Firm* — Skaar Ulbrich Macari, P.A.

(57) ABSTRACT

Provided is an optical element with a Fresnel structure with several Fresnel segments. Each Fresnel segment has an optically active facet, the shape of which is part of a predetermined surface. The predetermined surfaces of the optically active facets differ in terms of their curvature profile.

19 Claims, 6 Drawing Sheets

(51) Int. Cl.
*G02B 3/08* (2006.01)
*G02B 27/00* (2006.01)

(52) U.S. Cl.
CPC .. *G02B 27/0101* (2013.01); *G02B 2027/0178* (2013.01)

(58) Field of Classification Search
CPC ........ G02B 5/1876; G02B 5/09; G02B 5/136; G02B 27/0012; G02B 27/0025
USPC ....... 359/619–640, 566, 572, 574, 575, 576, 359/831, 833, 850–868, 742
See application file for complete search history.

(56) References Cited

U.S. PATENT DOCUMENTS

| | | | |
|---|---|---|---|
| 2005/0224695 A1* | 10/2005 | Mushika | G02B 26/06 250/208.2 |
| 2007/0008624 A1 | 1/2007 | Hirayama | |
| 2008/0041441 A1* | 2/2008 | Schwartzman | G02B 5/001 136/246 |
| 2009/0080037 A1 | 3/2009 | Hayashi | |
| 2011/0083742 A1* | 4/2011 | Munro | G02B 27/1006 136/259 |
| 2011/0157726 A1* | 6/2011 | Chen | F24J 2/085 359/742 |
| 2015/0036223 A1 | 2/2015 | Dobschal et al. | |

FOREIGN PATENT DOCUMENTS

| | | | |
|---|---|---|---|
| DE | 102012218684 A1 * | 10/2012 | ............ F21S 41/147 |
| EP | 0704655 A1 | 4/1996 | |
| EP | 1843179 A1 | 10/2007 | |
| GB | 2237122 A | 4/1991 | |
| JP | 200623630 A | 1/2006 | |

OTHER PUBLICATIONS

STIC search (Year: 2019).*
International Preliminary Report on Patentability including English translation of Written Opinion for application No. PCT/EP2014/066111 rendered by the International Bureau of WIPO dated Jan. 26, 2016, 16 pages.

* cited by examiner

OPTICAL ELEMENT WITH A FRESNEL STRUCTURE, AND DISPLAY DEVICE WITH SUCH AN OPTICAL ELEMENT

PRIORITY

This application claims the benefit of German Patent Application No. 102013214697.3, filed on Jul. 26, 2013, which is hereby incorporated herein by reference in its entirety.

FIELD

The present invention relates to an optical element with a Fresnel structure with several Fresnel segments, wherein each Fresnel segment has an optically active facet, the shape of which is part of a predetermined surface.

BACKGROUND

Optical elements used e.g. in display devices that can be fitted on the head are known from DE 10 2009 010 538 A1.

SUMMARY

An object of the invention includes developing an optical element such that it has improved imaging properties. In addition, a display device with such an optical element is to be provided.

In the optical elements with a Fresnel structure known until now, such as e.g. in DE 10 2009 010 538 A1, all facets have the same surface description and are thus part of the same predetermined surface. The predetermined surface is therefore optimized first and then the optically active facets are produced from it by a modulo operation (parallel offset of parts of the same surface).

According to certain embodiments, in the optical element the predetermined surfaces of the optically active facets (of at least two optically active facets) are different in terms of their curvature profiles. Thus this is not one and the same surface, but each optically active facet is, or the at least two optically active facets are, described by another predetermined surface (which differs from the other surfaces in particular in terms of its curvature profile). It is thereby possible to optimize each optically active facet or the at least two optically active facets separately, whereby the imaging properties of the Fresnel structure can be improved overall. Thus, compared with conventional Fresnel structures, e.g. monochromatic and polychromatic image errors (for example monochromatic transverse aberrations which can be expressed as blurring or ghosting, and transverse chromatic aberrations) can be reduced much better.

The predetermined surfaces can be spherical or aspherical surfaces and preferably have no mirror or rotational symmetry. In addition, it is possible for them to have no translational symmetry. There are thus many degrees of freedom, with the result that a very good optimization can take place, whereby very good imaging properties are provided.

The Fresnel structure is preferably formed on a boundary surface of the optical element.

The boundary surface of the optical element can be formed curved. In particular the optical element has a curved front side and a curved rear side. The front and rear sides can be spherically curved and in particular can be arranged concentrically.

Furthermore, the optical element can have an end face connecting the front and rear sides, which is flat or curved. The Fresnel structure according to the invention can be formed on the end face.

The optical element can be formed as a lens with a refractive power of zero or with a refractive power not equal to zero.

The Fresnel segments can neighbour each other directly, with the result that there is a continuous Fresnel structure. Alternatively it is possible for the Fresnel segments to be spaced apart from each other, with the result that the discontinuous Fresnel structure is present. In this case the original curvature profile of the boundary surface is present between the individual Fresnel segments.

The Fresnel structure preferably provides an optical imaging function.

The optically active facets can bring about a beam deflection by total internal reflection or by reflection. In particular they can be provided with a reflective coating. In addition, the Fresnel segments can be filled with a material such that the area of the Fresnel structure has the same surface profile as a neighbouring area.

The optically active facets of the optical element according to the invention cannot be assembled, by a parallel offset, to form a continuous surface, as the predetermined surfaces of the optically active facets differ in terms of their curvature profile.

In particular the optically active facets cannot be assembled (e.g. by parallel offset) to form a surface which is continuously differentiable. A tilting or another assembling also does not enable the assembled surface then to be continuously differentiable. This assembling is in particular an imaginary assembling which need not be carried out in actuality. The assembling can be carried out computationally if there is a corresponding surface description for each optically active facet. The surface description can be determined for example by a suitable measurement. Conventional Fresnel structures, in which the optically active facets are part of one and the same predetermined surface, can be assembled to form a continuously differentiable surface, in contrast to the Fresnel structure according to the invention.

The optical element can be formed from glass or plastic. The optically active facets are for example formed as pieces of surface. They can have a reflective coating.

In addition to the described formation of the Fresnel structure as a reflective structure, of course, it can also be formed as a refractive structure.

In the optical element according to certain embodiments, the optically active facets can be arranged next to each other along a first direction and extend in the form of strips transverse to the first direction.

Furthermore, it is possible for the optically active facets to be arranged next to each other along a first direction and along a second direction running transverse to the first direction. The Fresnel structure can thus have facets arranged next to each other as desired. The facets can be strip-shaped. They can also have any other shape. In particular, they can be formed as a polynomial with three, four, five or more corners, round, circular, etc. The more facets are provided, the more degrees of freedom there are for the optimization, and the better the optical results that can be achieved.

In the optical element according to certain embodiments, the Fresnel structure can be formed as a reflective Fresnel structure to deflect light bundles incident on the Fresnel structure along a direction of incidence into a direction of emergence, wherein the optically active facets are formed reflective and are arranged next to each other, and at least two directly neighbouring facets in each case have a first reflective section and an adjoining second reflective section, wherein the reflectivity of the first reflective section is greater than the reflectivity of the second reflective section and wherein, viewed in the direction of incidence, the second reflective section of a first reflective facet lies in front of the first reflective section of the directly neighbouring reflective facet, with the result that the part of the incident light bundle that is transmitted by the second reflective section of the first reflective facet strikes the first reflective section of the directly neighbouring reflective facet, in order to be deflected.

Through this partially transparent formation of the facets or through the second sections which are both reflective and transmissive, it is advantageously achieved that the deflected total light bundle which comprises all deflected light bundles has as uniform as possible a brightness distribution.

The first section of the facets can be only reflective or can be partially transparent, and thus both reflective and transmissive.

In the optical element, the second reflective section of the reflective facets can in each case have a first area which adjoins the first reflective section and a second area which adjoins the first area, wherein the second area of the first facet, viewed in the direction of incidence, lies in front of the first area of the directly neighbouring facet. A very homogeneous brightness distribution in the deflected total light bundle can thus be achieved. A light bundle is thus, as a rule, deflected by three facets, namely by the first reflective section of the first facet, the second reflective section of the second facet lying behind this and the second area of the third facet lying behind that.

In particular, the reflectivity of the first area can be greater than the reflectivity of the second area. A very good homogeneity of the brightness distribution in the deflected total light bundle is thus achieved.

In the optical element the Fresnel structure can be formed as a buried Fresnel structure.

In addition, a face which connects two directly neighbouring facets can be formed transparent.

Furthermore, a display device is provided, with an optical element according to certain embodiments, a holder that can be fitted on the head of a user, an image-generating module which generates an image and is secured to the holder, and an imaging optical system which is secured to the holder and which has the optical element and images the generated image, when the holder is fitted on the head, such that the user can perceive it as a virtual image, wherein the image generated by the image-generating module is coupled into the optical element via a coupling-in section of the optical element, guided in the optical element, by one or more reflections (e.g. total internal reflection), to a coupling-out section and coupled out of the optical element via the coupling-out section, wherein the coupling-in and/or coupling-out section has the Fresnel structure. If both the coupling-in and the coupling-out sections have the Fresnel structure, of course, the optical element has two Fresnel structures with several Fresnel segments, wherein each Fresnel segment has an optically active facet the shape of which is part of a predetermined surface which is different for different optically active facets in terms of its curvature profile.

The optical element can in particular be formed in the shape of a spectacle lens with a front side (in particular a curved front side) and a rear side (in particular a curved rear side), wherein when the holder is fitted on the head the front side faces away from the user and the rear side faces towards the user. If the Fresnel structure is formed as a reflective structure, it is preferably formed on the front side. In the formation of the Fresnel structure as a refractive structure, it is preferably formed on the rear side.

The front side of the optical element or of the spectacle lens can be spherically curved. In the same way, the rear side of the optical element or of the spectacle lens can be spherically curved. The radius of curvature of the front side and the rear side can in each case be smaller than or equal to 200 mm, preferably smaller than or equal to 140 mm and in particular smaller than or equal to 100 mm.

The coupling-in section can be formed on the rear side and/or on the end face which connects the front and rear sides.

The generated image can be guided in the optical element by at least two reflections, and thus at least one reflection on the front side and one reflection on the rear side. In order to bring about the reflections, the corresponding sections of the front and rear sides can have a reflective coating or a partially reflective coating. However, it is also possible for one or two reflective or partially reflective layers to be formed within the spectacle lens and for the reflection for guiding the image to take place thereon. In addition, it is possible for the reflections to be brought about on the front and rear sides by total internal reflection. The described types of image guidance by reflection can also be combined with each other.

The coupling-out section is preferably spaced apart from the coupling-in section. In particular the coupling-out section is arranged such that the coupling-out section lies within the visual field of a user when the holder is fitted on.

The image-generating module can in particular have a flat imaging system, such as e.g. an LCD module, an LCoS module or an OLED module. The imaging system can be self-luminous or not self-luminous.

The image-generating module can in particular be formed such that it generates a monochromatic or a multi-coloured image. Of course, the imaging optical system is formed correspondingly in this case.

The display device according to certain embodiments can have further elements known to a person skilled in the art which are necessary for its operation.

Furthermore, a method for producing the optical element according to certain embodiments is provided in which in a step a) an individual surface description is provided for each optically active facet, in a step b) the shape of the surface characterized by the surface description is optimized for each optically active facet, in order to determine the predetermined surface, in a step c) the production data are generated on the basis of the thus-determined predetermined surfaces and in a step d) the optical element is produced on the basis of the production data.

In the method according to certain embodiments, in step c), for each facet, the part of the determined predetermined surface which characterizes the optically active facet can be arranged computationally on a curved base surface.

Furthermore, in the method according to certain embodiments, each Fresnel segment can have a side face connected to the optically active facet and the side face can be designed such that it suppresses scattered light.

It is understood that the features mentioned above and those yet to be explained below can be used not only in the stated combinations but also in other combinations or alone, without departing from the scope of the present invention.

Figure 1:
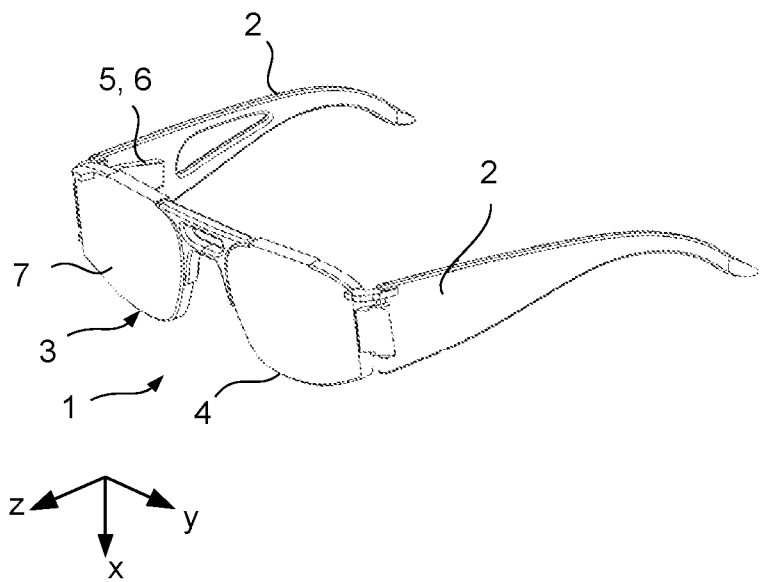
FIG. 1 is a schematic perspective representation of an embodiment of the display device according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the display device 1 according to the invention comprises a holder 2 which can be fitted on the head of a user and which can be formed e.g. in the manner of a conventional spectacles frame, as well as a first and a second spectacle lens 3, 4 which are secured to the holder 2. The holder 2 with the spectacle lenses 3 and 4 can be formed e.g. as sports glasses or sunglasses, wherein a virtual image can be reflected into the user's field of view via the first spectacle lens 3, as described below. The spectacle lenses 3, 4 are formed such that they have no optical imaging effect, and thus no correction of defective vision takes place.

The right-hand spectacle lens 3 is formed as an optical element according to the invention with a Fresnel structure 21 and is described here only by way of example as part of the display device 1 according to the invention.

As can best be seen from the enlarged detailed sectional view of the first (right-hand) spectacle lens 3 (the holder 2 is not represented), the display device 1 comprises an image-generating module 5, a control unit 6 for controlling the image-generating module 5 as well as a lens 22. The image-generating module 5, the control unit 6 and the lens 22 are represented purely schematically and are preferably secured to the holder 2.

The right-hand spectacle lens 3 has a spherically curved front side 7, a spherically curved rear side 8 as well as an end face 9. The spherical curvatures of the front and rear sides 7, 8 are preferably concentric or almost concentric. The spectacle lens is particularly preferably designed as a meniscus with no refractive power.

The light coming from the image-generating module 5 is coupled, by means of the lens 22, via the end face 9 into the spectacle lens 3 such that it is guided multiple times on the front and rear sides 8, 9 (here in each case twice in the areas 23, 24, 25, 26) by means of total internal reflection to the Fresnel structure 21. The Fresnel structure 21 is formed on the front side 7 such that it deflects the light beams in the direction towards an exit pupil 14, against which a user has the pupil of his eye when the display device 1 is fitted on. In the embodiment described here, the Fresnel structure 21 has, in addition to its function of beam path folding, also an imaging function. In conjunction with the lens 22 as well as a possibly provided imaging effect of the end face 9, the image generated by means of the image-generating module 5 is presented to the user in the exit pupil 14 as a virtual image.

The Fresnel structure 21 thus forms a coupling-out section together with the path through the spectacle lens 3 to the rear side 8, through which the light passes after reflection on the Fresnel structure 21. The end face 9 forms a coupling-in section which optionally also comprises the area of the first reflection on the front side 7. Although the Fresnel structure 21 is part of the coupling-out section in the described embodiment, it can alternatively or additionally be part of the coupling-in section.

As indicated in the enlarged detailed view according to FIG. 3, the Fresnel structure 21 has several Fresnel segments 27 which in each case have an optically active facet 28 on which the light beams are reflected (in FIG. 3 the reference numbers 28 of the facets are also provided with a subscript in order to be able to differentiate between the individual facets in the following description; if no differentiation is necessary, the subscript is omitted). The optically active facets 28 are connected to each other by side faces 29. The facets 28 extend, as can be seen in the schematic perspective view according to FIG. 4 from the direction 30 according to FIG. 3, substantially in the x-direction, wherein in the representation from FIG. 4 the area of the facets 28 used as well as a light beam L are represented, in order to indicate the imaging and beam-deflecting effect of the Fresnel structure 21.

Figure 3:
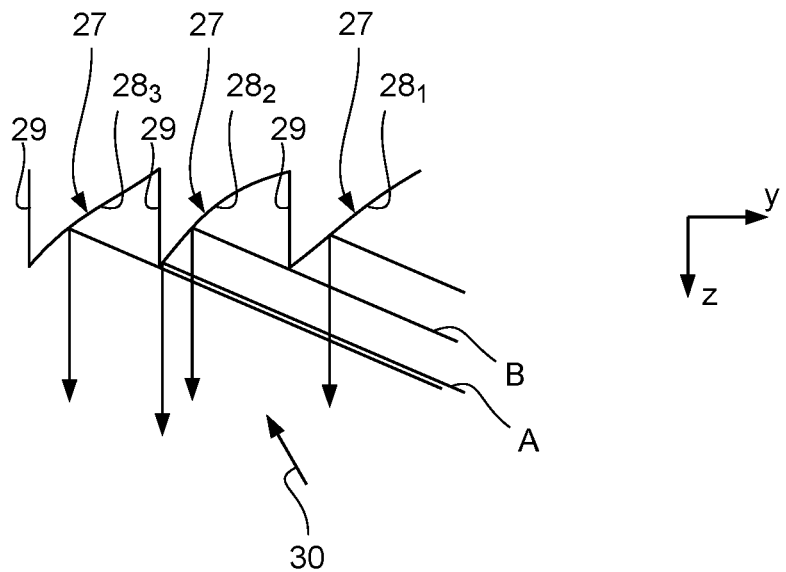
FIG. 3 is an enlarged sectional view of three Fresnel segments of the Fresnel structure.

The shape of each optically active facet 28 and in particular the cross-sectional shape indicated in FIG. 3 is in each case part of a predetermined surface which, however, differs for the individual optically active facets 28 in respect of the curvature profile. It is thus possible to achieve an imaging property or error correction that is improved compared with conventional Fresnel structures. In conventional Fresnel structures, such as are described e.g. in DE 10 2009 010 538 A1, the shape of the optically active facets is part of one and the same predetermined surface, wherein the facets are only offset in parallel to each other.

In the formation according to the invention of the Fresnel structure 21, however, the predetermined surface for the facets 28 is different from facet 28 to facet 28. There are thus more degrees of freedom for the optimization of the shape of the optically active facets 28, whereby for example an improved correction of monochromatic and polychromatic image errors (such as e.g. monochromatic transverse aberrations which can be expressed as blurring or ghosting, or transverse chromatic aberrations) is possible.

Such a formation of the optically active facets 28 can be achieved in that for each optically active facet 28 an individual surface description is provided and computationally optimized. In the optimization it is taken into account which beams strike which facets 28. It is preferably taken into account whether shadows or misses occur for the individual beams. Thus, for example, in the beam A according to FIG. 3 there is the difficulty that this beam, which should strike the facet $28_3$, is shadowed by the facet $28_2$. In the beam B there is the difficulty that the latter misses the facet $28_1$ and instead strikes the facet $28_2$. These effects are preferably taken into account in the optimization. Thus, a non-sequential ray tracing can e.g. be carried out.

The predetermined surface for each of the optically active facets 28 can be described by the polynomial specified below:

$$z(x, y) = \sum_{i,j} c_{ij} x^i y^j$$

Figure 4:
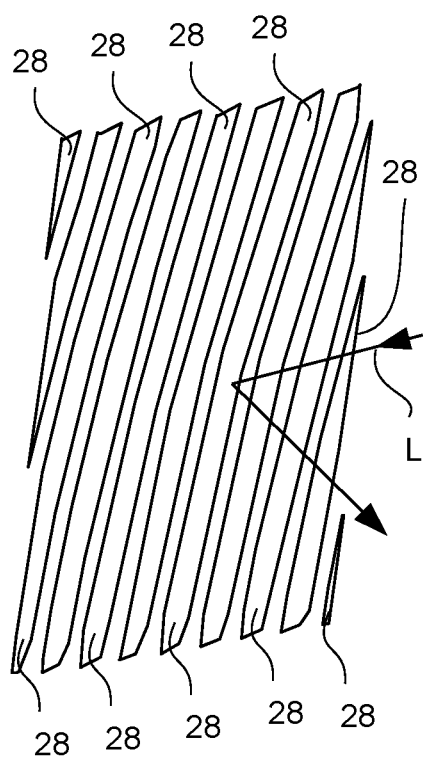
FIG. 4 is a schematic perspective representation of the optically active facets of the Fresnel structure.

The values of the coefficients $c_j$ for the facets 28 represented schematically in FIG. 4 are specified in the following tables, wherein in the tables the facets from right to left in FIG. 1 are called facets $28_1$, $28_2$, ... $28_{10}$. In other words the facet $28_1$ is the facet which is drawn on the far right in FIG. 4.

| | | $28_1$ | $28_2$ | $28_3$ | $28_4$ |
|---|---|---|---|---|---|
| 1 | 0 | −5.11001E−01 | −5.06717E−01 | −5.08911E−01 | −5.10653E−01 |
| 0 | 1 | 1.98300E−01 | 1.98297E−01 | 1.97861E−01 | 1.96518E−01 |
| 2 | 0 | −1.54842E−02 | −1.53269E−02 | −1.53576E−02 | −1.54167E−02 |
| 1 | 1 | −1.96714E−03 | −1.79080E−03 | −1.84563E−03 | −1.82952E−03 |
| 0 | 2 | −1.30679E−03 | −1.21075E−03 | −1.17580E−03 | −1.28862E−03 |
| 3 | 0 | −1.24682E−03 | −1.26086E−03 | −1.25496E−03 | −1.24939E−03 |
| 2 | 1 | −3.92790E−04 | −3.97206E−04 | −3.93432E−04 | −3.92998E−04 |
| 1 | 2 | 7.22918E−05 | 6.61487E−05 | 6.75654E−05 | 7.25958E−05 |
| 0 | 3 | −8.25141E−05 | −7.86773E−05 | −7.92069E−05 | −7.84288E−05 |
| 4 | 0 | −5.26429E−05 | −5.20301E−05 | −5.24275E−05 | −5.26564E−05 |
| 3 | 1 | −2.27439E−05 | −2.31240E−05 | −2.32147E−05 | −2.31936E−05 |
| 2 | 2 | 1.62587E−05 | 1.63645E−05 | 1.61923E−05 | 1.59931E−05 |
| 1 | 3 | 2.38257E−05 | 2.36092E−05 | 2.34395E−05 | 2.35530E−05 |
| 0 | 4 | 1.15732E−05 | 1.10208E−05 | 1.09565E−05 | 1.13151E−05 |
| 5 | 0 | −9.18387E−07 | −8.92197E−07 | −8.94642E−07 | −9.10034E−07 |
| 4 | 1 | 1.64737E−07 | 2.49000E−07 | 2.25710E−07 | 2.13898E−07 |
| 3 | 2 | −7.04229E−07 | −7.04574E−07 | −7.01783E−07 | −6.87047E−07 |
| 2 | 3 | 2.73228E−06 | 2.72580E−06 | 2.73956E−06 | 2.73027E−06 |
| 1 | 4 | 1.91307E−06 | 1.95427E−06 | 1.96011E−06 | 1.93095E−06 |
| 0 | 5 | 6.49828E−07 | 6.65795E−07 | 6.65191E−07 | 6.47312E−07 |
| 6 | 0 | 0 | −9.93512E−09 | −4.52997E−09 | 3.42893E−10 |
| 5 | 1 | 2.69634E−08 | 1.79852E−08 | 2.29146E−08 | 2.43783E−08 |
| 4 | 2 | −6.00929E−08 | −5.66094E−08 | −5.58933E−08 | −5.81360E−08 |
| 3 | 3 | 1.00285E−07 | 1.05796E−07 | 1.05959E−07 | 1.05357E−07 |
| 2 | 4 | −3.04003E−09 | −4.27318E−09 | −3.02924E−09 | −1.86757E−09 |
| 1 | 5 | 8.49682E−08 | 8.23087E−08 | 8.32663E−08 | 8.26673E−08 |
| 0 | 6 | 0 | 4.33427E−09 | 4.24302E−09 | 2.09091E−09 |

| | | $28_5$ | $28_6$ | $28_7$ | $28_8$ |
|---|---|---|---|---|---|
| 1 | 0 | −5.12229E−01 | −5.14594E−01 | −5.15955E−01 | −5.16851E−01 |
| 0 | 1 | 1.95532E−01 | 1.94510E−01 | 1.93776E−01 | 1.94482E−01 |
| 2 | 0 | −1.54537E−02 | −1.55180E−02 | −1.55503E−02 | −1.55563E−02 |
| 1 | 1 | −1.95651E−03 | −1.97041E−03 | −2.00688E−03 | −2.00897E−03 |
| 0 | 2 | −1.29727E−03 | −1.40048E−03 | −1.44538E−03 | −1.40143E−03 |
| 3 | 0 | −1.24735E−03 | −1.24238E−03 | −1.24139E−03 | −1.24068E−03 |
| 2 | 1 | −3.90284E−04 | −3.87185E−04 | −3.87155E−04 | −3.88101E−04 |
| 1 | 2 | 7.60287E−05 | 7.36752E−05 | 7.78689E−05 | 7.83255E−05 |
| 0 | 3 | −7.90777E−05 | −7.49743E−05 | −7.62271E−05 | −7.91817E−05 |
| 4 | 0 | −5.26888E−05 | −5.28727E−05 | −5.28696E−05 | −5.29263E−05 |
| 3 | 1 | −2.29031E−05 | −2.31511E−05 | −2.29801E−05 | −2.28691E−05 |
| 2 | 2 | 1.60416E−05 | 1.63667E−05 | 1.62324E−05 | 1.60841E−05 |
| 1 | 3 | 2.35326E−05 | 2.39586E−05 | 2.39342E−05 | 2.37730E−05 |
| 0 | 4 | 1.14313E−05 | 1.14766E−05 | 1.17861E−05 | 1.18219E−05 |
| 5 | 0 | −9.08727E−07 | −9.18540E−07 | −9.16975E−07 | −9.11918E−07 |
| 4 | 1 | 1.69942E−07 | 1.85048E−07 | 1.68505E−07 | 1.58543E−07 |
| 3 | 2 | −7.06003E−07 | −7.15328E−07 | −7.14136E−07 | −7.09736E−07 |
| 2 | 3 | 2.73684E−06 | 2.70315E−06 | 2.70739E−06 | 2.72841E−06 |
| 1 | 4 | 1.91926E−06 | 1.89681E−06 | 1.88765E−06 | 1.89743E−06 |
| 0 | 5 | 6.41662E−07 | 6.23994E−07 | 6.14868E−07 | 6.17923E−07 |
| 6 | 0 | −1.30910E−09 | 2.05619E−09 | 1.12957E−09 | 5.80745E−10 |
| 5 | 1 | 2.72241E−08 | 2.66342E−08 | 2.74512E−08 | 2.86048E−08 |
| 4 | 2 | −5.85357E−08 | −5.94481E−08 | −5.92537E−08 | −5.87440E−08 |
| 3 | 3 | 1.01992E−07 | 1.01248E−07 | 1.00996E−07 | 1.00577E−07 |

-continued

| | | | | | |
|---|---|---|---|---|---|
| 2 | 4 | −2.56764E−09 | −4.18878E−09 | −3.98195E−09 | −3.59928E−09 |
| 1 | 5 | 8.50277E−08 | 8.26160E−08 | 8.25324E−08 | 8.38183E−08 |
| 0 | 6 | 4.47704E−10 | 2.89106E−10 | −1.25421E−09 | −1.61203E−09 |

| | | $28_9$ | $28_{10}$ |
|---|---|---|---|
| 1 | 0 | −5.12989E−01 | −5.11001E−01 |
| 0 | 1 | 1.96766E−01 | 1.98300E−01 |
| 2 | 0 | −1.54704E−02 | −1.54842E−02 |
| 1 | 1 | −1.94313E−03 | −1.96714E−03 |
| 0 | 2 | −1.31549E−03 | −1.30679E−03 |
| 3 | 0 | −1.24590E−03 | −1.24682E−03 |
| 2 | 1 | −3.92266E−04 | −3.92790E−04 |
| 1 | 2 | 7.59196E−05 | 7.22918E−05 |
| 0 | 3 | −8.10036E−05 | −8.25141E−05 |
| 4 | 0 | −5.27569E−05 | −5.26429E−05 |
| 3 | 1 | −2.27658E−05 | −2.27439E−05 |
| 2 | 2 | 1.60815E−05 | 1.62587E−05 |
| 1 | 3 | 2.35126E−05 | 2.38257E−05 |
| 0 | 4 | 1.16977E−05 | 1.15732E−05 |
| 5 | 0 | −9.09028E−07 | −9.18387E−07 |
| 4 | 1 | 1.61162E−07 | 1.64737E−07 |
| 3 | 2 | −7.09066E−07 | −7.04229E−07 |
| 2 | 3 | 2.74589E−06 | 2.73228E−06 |
| 1 | 4 | 1.92936E−06 | 1.91307E−06 |
| 0 | 5 | 6.14998E−07 | 6.49828E−07 |
| 6 | 0 | −6.65430E−10 | 0 |
| 5 | 1 | 2.77488E−08 | 2.69634E−08 |
| 4 | 2 | −5.80719E−08 | −6.00929E−08 |
| 3 | 3 | 1.01456E−07 | 1.00285E−07 |
| 2 | 4 | −3.97533E−09 | −3.04003E−09 |
| 1 | 5 | 8.34440E−08 | 8.49682E−08 |
| 0 | 6 | 1.59656E−09 | 0 |

Figure 2:
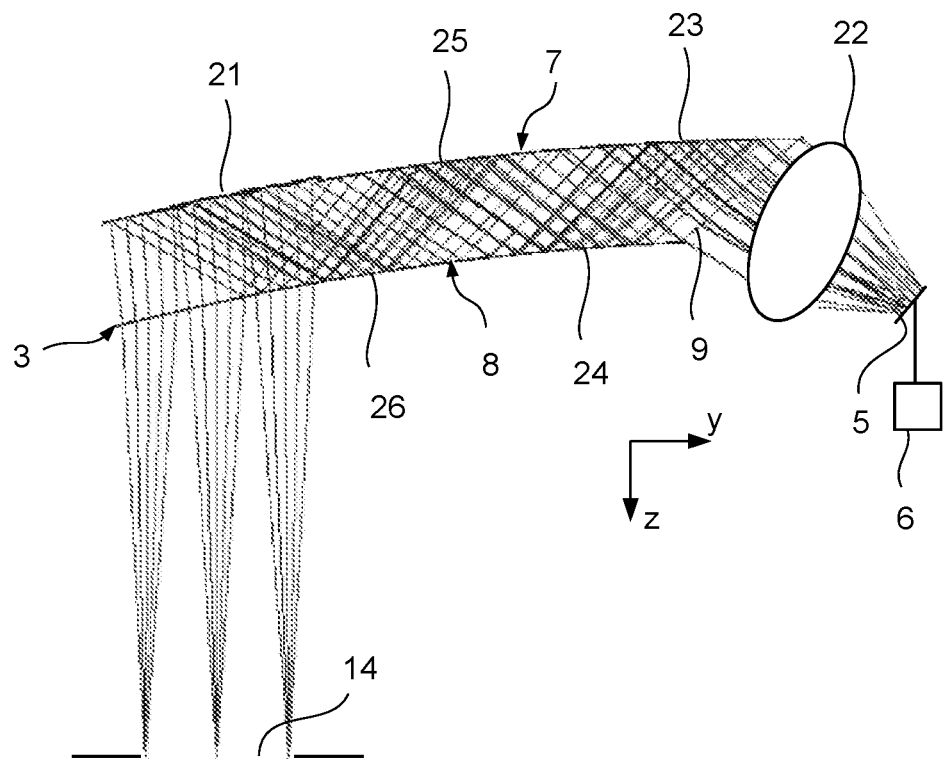
FIG. 2 is a detailed sectional view of the right-hand spectacle lens 3 of the display device 1 from FIG. 1.
Figure 5:
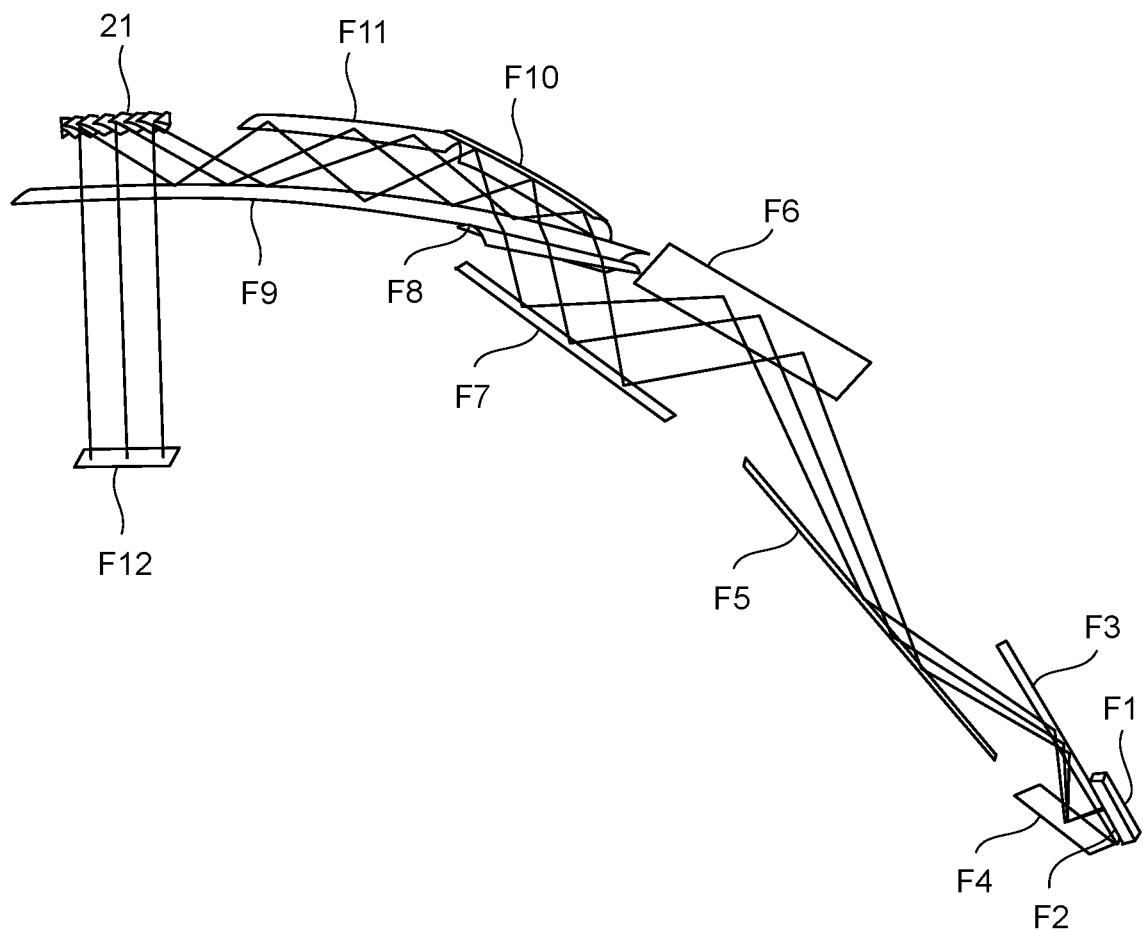
FIG. 5 is a schematic sectional view of the optically used surfaces of the display device from FIG. 1.

To describe the optical structure of the display device according to the invention, it is represented in FIG. 5 in a similar way to in FIG. 2, wherein in the representation from FIG. 5 essentially only the optically active surfaces are represented schematically. Furthermore the three beam pathes are drawn in for clarification.

The surfaces F1 and F2 relate to a cover glass of the image-generating module, wherein an imaging system, not shown, is arranged on the surface F1.

The surfaces F3 to F8 are surfaces of a prism which is provided instead of the lens 22 represented schematically in FIG. 2.

The surfaces F9, F10 and F11 are surfaces of the right-hand spectacle lens 3. The surface F12 is the exit pupil 14 according to FIG. 2.

The orientations of these surfaces are specified below, wherein it is assumed that the coordinate origin lies in the surface F12, with the result that all specifications below in respect of the surfaces F1-F12 relate to this coordinate system. For this, the value of the x, y and z location coordinates in the "location" row is specified for each surface. In addition, the x, y and z directional component of the corresponding surface coordinate system in respect of the surface F12 is specified as EX, EY and EZ for each surface.

This is specified in the following table for all surfaces F1-F12 as well as all facets $28_1$-$28_{10}$.

The surface F1 is thus offset relative to the coordinate system of the surface F12 by 56.4602673 mm in the x-direction, by 2.7796851 mm in the y-direction and by 21.6640695 mm in the z-direction. The x-axis ("EX" row) of the surface F1 has −0.480488 as x-component, 0.1608098 as y-component and −0.8621319 as z-component in relation to the unit vector. The corresponding component values for the y-axis ("EY" row) and the z-axis ("EZ" row) of this surface F1 are correspondingly specified.

| Surface F1 | | | |
|---|---|---|---|
| Location | 56.4602673 | 2.7796851 | 21.6640695 |
| EX | −0.480488 | 0.1608098 | −0.8621319 |
| EY | −0.1557581 | 0.9517695 | 0.2643375 |
| EZ | 0.8630589 | 0.2612951 | −0.4322664 |

| Surface F2 | | | |
|---|---|---|---|
| Location | 55.8561261 | 2.5967786 | 21.9666559 |
| EX | −0.480488 | 0.1608098 | −0.8621319 |
| EY | −0.1557581 | 0.9517695 | 0.2643375 |
| EZ | 0.8630589 | 0.2612951 | −0.4322664 |

| Surface F3 Entry into prism | | | |
|---|---|---|---|
| Location | 55.3762325 | 2.3425856 | 21.8147278 |
| EX | −0.4998 | 0.1601816 | −0.8512002 |
| EY | −0.1458082 | 0.953165 | 0.264984 |
| EZ | 0.8537798 | 0.256551 | −0.453036 |

| Surface F4 1$^{st}$ reflection | | | |
|---|---|---|---|
| Location | 53.4739615 | 1.6887478 | 22.1769381 |
| EX | −0.7629759 | −0.090901 | −0.6400037 |
| EY | −0.3242707 | 0.9103038 | 0.2572848 |
| EZ | 0.5592104 | 0.4038365 | −0.7240164 |

| Surface F3 2$^{nd}$ reflection | | | |
|---|---|---|---|
| Location | 53.2147214 | 3.0076113 | 18.1178009 |
| EX | 0.489922 | −0.1014512 | 0.865843 |
| EY | −0.1761718 | 0.9611916 | 0.2123069 |
| EZ | −0.8537798 | −0.256551 | 0.453036 |

| Surface F5 3$^{rd}$ reflection | | | |
|---|---|---|---|
| Location | 43.9556606 | 3.8186335 | 12.2346015 |
| EX | −0.6338181 | 0.0940485 | −0.7677431 |
| EY | −0.1141749 | 0.9703311 | 0.2131237 |
| EZ | 0.765009 | 0.2227387 | −0.6042754 |

| Surface F6 4$^{th}$ reflection | | | |
|---|---|---|---|
| Location | 36.621434 | 7.8999442 | −5.3665923 |
| EX | 0.8464867 | 0.0442762 | 0.5305657 |
| EY | −0.2575684 | 0.9062147 | 0.335311 |
| EZ | −0.4659601 | −0.4204932 | 0.7785028 |

| Surface F7 5$^{th}$ reflection 104 | | | |
|---|---|---|---|
| Location | 26.1751191 | 4.5087813 | −4.7546122 |
| EX | −0.7938649 | 0.0023845 | −0.6080895 |
| EY | −0.1504673 | 0.9681253 | 0.2002323 |
| EZ | 0.5891843 | 0.250455 | −0.7682019 |

| Surface F8 Exit from prism, freeform surface | | | |
|---|---|---|---|
| Location | 24.6666748 | 4.705117 | −11.1046731 |
| EX | 0.9562232 | −0.0641391 | 0.285523 |
| EY | 0.0022923 | 0.9772973 | 0.2118602 |
| EZ | −0.2926294 | −0.2019311 | 0.9346614 |

| Surface F9 Entry into spectacle lens via rear side 8, radius 90 mm | | | |
|---|---|---|---|
| Location | −0.0000001 | −0.0000002 | −15.6995003 |
| EX | 0.999814 | 0.0018171 | −0.0192 |
| EY | 0.0000001 | 0.995551 | 0.0942242 |
| EZ | 0.0192858 | −0.0942067 | 0.9953658 |

| Surface F10 Reflection in the section 23, freeform surface | | | |
|---|---|---|---|
| Location | 24.7480995 | 9.5460548 | −13.3644689 |
| EX | 0.8156392 | 0.0925728 | 0.5711067 |
| EY | −0.2124713 | 0.9660696 | 0.1468519 |
| EZ | −0.5381344 | −0.241122 | 0.8076333 |

| Surface F9 Total internal reflection on rear side 8 | | | |
|---|---|---|---|
| Location | −0.0000001 | −0.0000002 | −15.6995003 |
| EX | −0.999814 | −0.0018171 | 0.0192 |
| EY | 0.0000001 | 0.995551 | 0.0942242 |
| EZ | −0.0192858 | 0.0942067 | −0.9953658 |

| Surface F11 Total internal reflection on front side 7, radius 94 mm | | | |
|---|---|---|---|
| Location | −0.0771433 | 0.3768266 | −19.6809637 |
| EX | 0.999814 | 0.0018171 | −0.0192 |
| EY | 0.0000001 | 0.995551 | 0.0942242 |
| EZ | 0.0192858 | −0.0942067 | 0.9953658 |

| Surface F9 Total internal reflection on rear side 8 | | | |
|---|---|---|---|
| Location | −0.0000001 | −0.0000002 | −15.6995003 |
| EX | −0.999814 | −0.0018171 | 0.0192 |
| EY | 0.0000001 | 0.995551 | 0.0942242 |
| EZ | −0.0192858 | 0.0942067 | −0.9953658 |

| Surface 28$_1$ | | | |
|---|---|---|---|
| Location | −10.2887926 | 7.8252771 | −16.0634171 |
| EX | −0.9864933 | −0.1215025 | 0.109855 |
| EY | −0.0991071 | 0.9767123 | 0.1902918 |
| EZ | −0.1304177 | 0.1768342 | −0.9755618 |

| Surface 28$_2$ | | | |
|---|---|---|---|
| Location | −10.2301046 | 7.7457018 | −15.6244142 |
| EX | −0.9864933 | −0.1215025 | 0.109855 |
| EY | −0.0991071 | 0.9767123 | 0.1902918 |
| EZ | −0.1304177 | 0.1768342 | −0.9755618 |

| Surface 28$_3$ | | | |
|---|---|---|---|
| Location | −10.1714167 | 7.6661264 | −15.1854114 |
| EX | −0.9864933 | −0.1215025 | 0.109855 |
| EY | −0.0991071 | 0.9767123 | 0.1902918 |
| EZ | −0.1304177 | 0.1768342 | −0.9755618 |

| Surface 28$_4$ | | | |
|---|---|---|---|
| Location | −10.1127287 | 7.586551 | −14.7464086 |
| EX | −0.9864933 | −0.1215025 | 0.109855 |
| EY | −0.0991071 | 0.9767123 | 0.1902918 |
| EZ | −0.1304177 | 0.1768342 | −0.9755618 |

| Surface 28$_5$ | | | |
|---|---|---|---|
| Location | −10.0540408 | 7.5069756 | −14.3074058 |
| EX | −0.9864933 | −0.1215025 | 0.109855 |
| EY | −0.0991071 | 0.9767123 | 0.1902918 |
| EZ | −0.1304177 | 0.1768342 | −0.9755618 |

| Surface 28$_6$ | | | |
|---|---|---|---|
| Location | −9.9953528 | 7.4274003 | −13.8684029 |
| EX | −0.9864933 | −0.1215025 | 0.109855 |
| EY | −0.0991071 | 0.9767123 | 0.1902918 |
| EZ | −0.1304177 | 0.1768342 | −0.9755618 |

| Surface $28_7$ | | | |
|---|---|---|---|
| Location | −9.9366649 | 7.3478249 | −13.4294001 |
| EX | −0.9864933 | −0.1215025 | 0.109855 |
| EY | −0.0991071 | 0.9767123 | 0.1902918 |
| EZ | −0.1304177 | 0.1768342 | −0.9755618 |

| Surface $28_8$ | | | |
|---|---|---|---|
| Location | −9.8779769 | 7.2682495 | −12.9903973 |
| EX | −0.9864933 | −0.1215025 | 0.109855 |
| EY | −0.0991071 | 0.9767123 | 0.1902918 |
| EZ | −0.1304177 | 0.1768342 | −0.9755618 |

| Surface $28_9$ | | | |
|---|---|---|---|
| Location | −9.8192889 | 7.1886742 | −12.5513944 |
| EX | −0.9864933 | −0.1215025 | 0.109855 |
| EY | −0.0991071 | 0.9767123 | 0.1902918 |
| EZ | −0.1304177 | 0.1768342 | −0.9755618 |

| Surface $28_{10}$ | | | |
|---|---|---|---|
| Location | −9.760601 | 7.1090988 | −12.1123916 |
| EX | −0.9864933 | −0.1215025 | 0.109855 |
| EY | −0.0991071 | 0.9767123 | 0.1902918 |
| EZ | −0.1304177 | 0.1768342 | −0.9755618 |

| Surface F9 Exit from spectacle lens 3 | | | |
|---|---|---|---|
| Location | 0 | 0 | −15.6995 |
| EX | 0.999814 | 0.0018171 | −0.0192 |
| EY | 0.0000001 | 0.995551 | 0.0942242 |
| EZ | 0.0192858 | −0.0942067 | 0.9953658 |

| Surface F12 | | | |
|---|---|---|---|
| Location | 0 | 0 | 0 |
| EX | 1 | 0 | 0 |
| EY | 0 | 1 | 0 |
| EZ | 0 | 0 | 1 |

The values for the freeform surfaces F8 and F10 are specified in the following table in the same way as for the facets $28_1$-$28_{10}$.

| | | F8 | F10 |
|---|---|---|---|
| 1 | 0 | −2.69940E−02 | 0 |
| 0 | 1 | 3.06786E−03 | 0 |
| 2 | 0 | −3.56798E−03 | 1.14973E−02 |
| 1 | 1 | −7.29234E−03 | 4.45868E−04 |
| 0 | 2 | 9.51758E−03 | 9.16551E−03 |
| 3 | 0 | −3.65288E−04 | 1.01450E−04 |
| 2 | 1 | −6.30398E−05 | 2.83498E−05 |
| 1 | 2 | −1.80824E−04 | 3.42169E−05 |
| 0 | 3 | −7.36505E−05 | 6.94948E−06 |
| 4 | 0 | 3.11041E−05 | 1.52520E−06 |
| 3 | 1 | −4.90029E−05 | 6.49715E−06 |
| 2 | 2 | −3.58994E−05 | 9.35341E−07 |
| 1 | 3 | 9.04467E−06 | 1.60443E−06 |
| 0 | 4 | 6.16336E−08 | 8.08264E−07 |
| 5 | 0 | 1.61380E−06 | 2.73710E−07 |
| 4 | 1 | −3.56986E−07 | −1.50363E−07 |
| 3 | 2 | −1.46244E−06 | −6.19532E−08 |
| 2 | 3 | 6.66230E−07 | −1.90150E−08 |
| 1 | 4 | −1.51679E−06 | 2.67477E−07 |
| 0 | 5 | 5.70054E−07 | 6.96397E−09 |
| 6 | 0 | 4.34415E−07 | 2.54133E−08 |
| 5 | 1 | −1.51562E−08 | −1.65761E−09 |
| 4 | 2 | −2.28541E−07 | −1.81043E−08 |
| 3 | 3 | −5.44341E−08 | 1.47308E−08 |
| 2 | 4 | 3.13272E−07 | −3.74204E−10 |
| 1 | 5 | 1.25625E−07 | −2.50990E−08 |
| 0 | 6 | −3.29481E−08 | 3.18622E−09 |
| 7 | 0 | −3.27984E−08 | 8.28855E−10 |
| 6 | 1 | −4.66566E−08 | −5.27318E−10 |
| 5 | 2 | 3.16837E−10 | 1.02033E−09 |
| 4 | 3 | 3.20374E−08 | −1.14635E−09 |
| 3 | 4 | 1.10706E−08 | −1.16495E−09 |
| 2 | 5 | −2.05587E−08 | −1.63862E−09 |
| 1 | 6 | −4.70939E−09 | 2.64884E−11 |
| 0 | 7 | −1.54349E−09 | −2.25617E−10 |
| 8 | 0 | 0 | −1.80003E−10 |
| 7 | 1 | 0 | −2.83214E−11 |
| 6 | 2 | 0 | 1.69034E−10 |
| 5 | 3 | 0 | 1.42023E−10 |
| 4 | 4 | 0 | −2.12468E−10 |
| 3 | 5 | 0 | −2.24496E−10 |
| 2 | 6 | 0 | −9.09024E−11 |
| 1 | 7 | 0 | 2.10367E−11 |
| 0 | 8 | 0 | −1.01283E−12 |

As can be seen from the above specifications, the light beams enter the prism via the cover glass (surfaces F1 and F2) on the surface F3. There is then a reflection on the surface F4, on the surface F3, on the surface F5, on the surface F6, on the surface F7, with the result that the light beams exit from the prism via the surface F8 and enter the spectacle lens via the rear side 8 (surface F9). In the spectacle lens there are then reflections on the front side 7 and rear side 8 (surfaces F10, F9 and F11), with the result that the light bundles are guided to the Fresnel structure 21, on which they are deflected in the described manner in the direction towards the eye, with the result that they exit from the spectacle lens via the rear side 8 (surface F9) and can be perceived by an eye of the user in the area of the surface F12.

Figure 6:
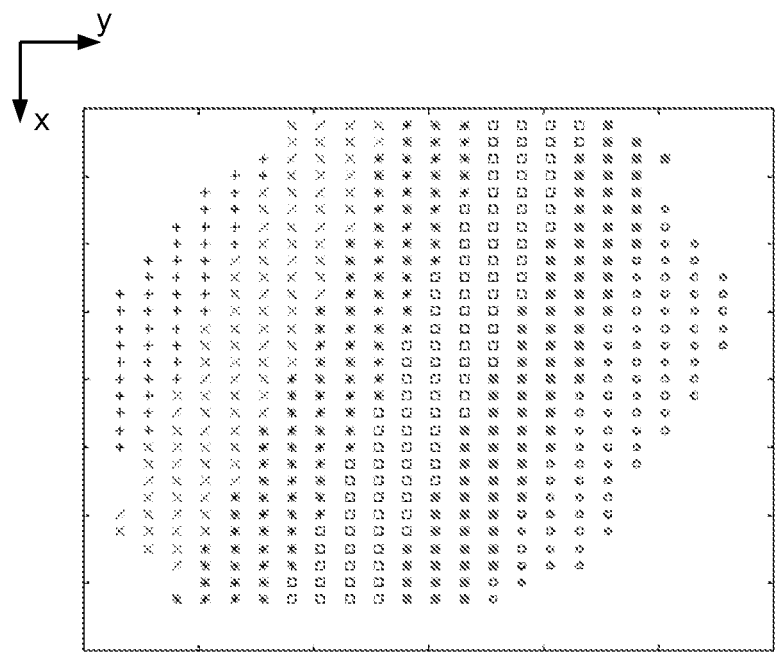
FIG. 6 is a schematic representation of the imaging of a field point into the exit pupil.

In FIG. 6 the pupil of a field point, and thus the imaging of an image pixel into the exit pupil 14, is represented in arbitrary units, wherein the different shapes stand for reflection on different facets 28. FIG. 6 shows that the observed field point is imaged into the exit pupil 14 by six optically active facets 28.

In the optimization of the predetermined surfaces for the optically active facets 28 it is also possible to allow a shadowing to occur (beam A) or for the beam to miss its original facet (beam B), and then these beams are also taken into account in the optimization of the shape of the predetermined surface. It has been shown according to the invention that in the embodiment example described here it is sufficient to take the directly neighbouring facets 28 into account.

Furthermore the suppression of undesired stray light can also be taken into account in the optimization. For this, in particular, the shape of the side faces 29 is altered in respect of the stray light optimization.

The reflection on the facets 28 can be a total internal reflection. It is also possible for the facets 28 to be provided with a reflective coating in order to obtain the desired reflection. For example this can be a partially transparent coating, with the result that, in addition to the reflection on the facets 28, a certain transmittance is also possible, with the result that the user can perceive the surroundings even in the area of the facets 28. Of course, the reflective coating can also be formed such that it is completely reflective and does not transmit any light.

Figure 7:
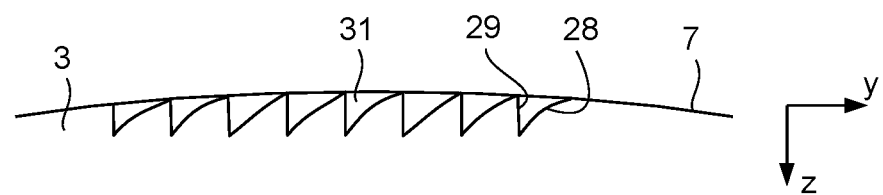
FIG. 7 is a representation according to FIG. 3 to explain a further embodiment of the formation of the Fresnel structure.

As indicated in the schematic sectional representation in FIG. 7, the free spaces formed by the formation of the facets can be filled, on the front side 7, with material 31 such that the original shape of the front side 7 is also present in the area of the Fresnel structure 21. If the facets 28 are provided with a reflective coating, the same material can be used for the filling as for the spectacle lens 3. If a total internal reflection is desired, a corresponding different material is chosen in which a total internal reflection is possible.

Figure 8:
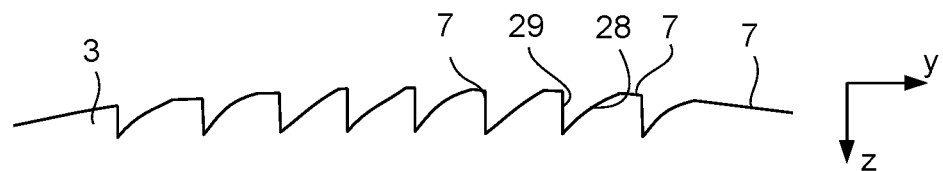
FIG. 8 is a schematic representation according to FIG. 7 according to a further embodiment of the Fresnel structure according to the invention.

The previously described Fresnel structure 21 is a continuous Fresnel structure in which the side faces 29 connect neighbouring facets 28. However, it is also possible to form the Fresnel structure 21 as a discontinuous Fresnel structure 21, as indicated in FIG. 8. In this case, the side faces 29 do not connect two neighbouring facets 28, but there is another section of the front side 7 between the side face 29 and the neighbouring facet 28. These areas are transmissive, with the result that the facets 28 can be provided e.g. with a reflective coating and a superimposition of the surroundings and the imaged virtual image is still possible even within the Fresnel structure 21. The reflection can also take place by total internal reflection in the formation as a discontinuous Fresnel structure 21 and a material filling can be carried out in the same way as was described in conjunction with FIG. 6. This is thus possible for the case of the total internal reflection and also for the case of the reflective coating.

In the previously described embodiments the facets 28 are formed strip-shaped or elongate, wherein they are arranged next to each other in a first direction (here the y-direction) and extend in the form of strips in a second direction transverse to the first direction (here approximately the x-direction), as can be seen in particular in FIG. 4. It can also be said that the facets 28 are arranged next to each other transverse to their longitudinal direction. By the strip-shaped formation of the facets 28 is meant here in particular that the extent of the facets 28 is greater in the second direction or in the longitudinal direction (thus here in approximately the x-direction) than in the first direction or in the transverse direction (here the y-direction). In particular the extent in the longitudinal direction is at least twice as great as the extent in the transverse direction.

Figure 9:
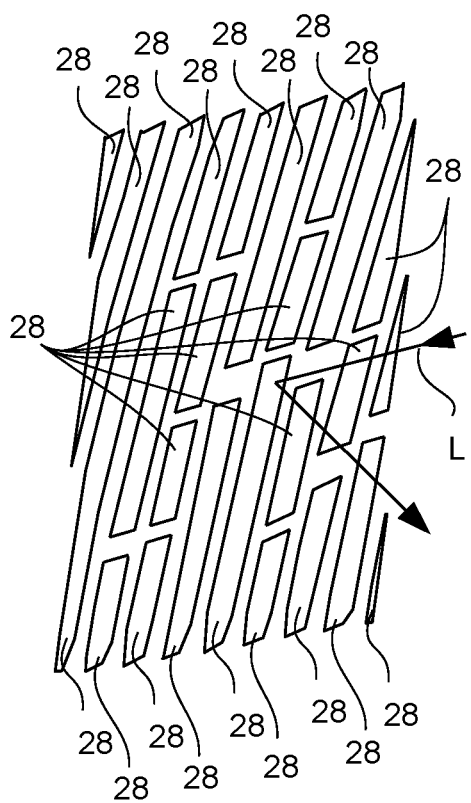
FIG. 9 is a schematic perspective representation of the optically active facets of the Fresnel structure according to a further embodiment.

However, the facets 28 need not be formed strip-shaped. It is also possible for the facets 28 to be arranged next to each other along the second direction (here approximately the x-direction). Thus, e.g., the strip-shaped facets according to FIG. 4 can be divided in the longitudinal direction, as indicated in FIG. 9. Each of the individual facets is preferably optimized individually. Thus, each of the facets 28 can be part of a predetermined surface, wherein the predetermined surfaces of the facets 28 differ in respect of their curvature profile.

Figure 10:
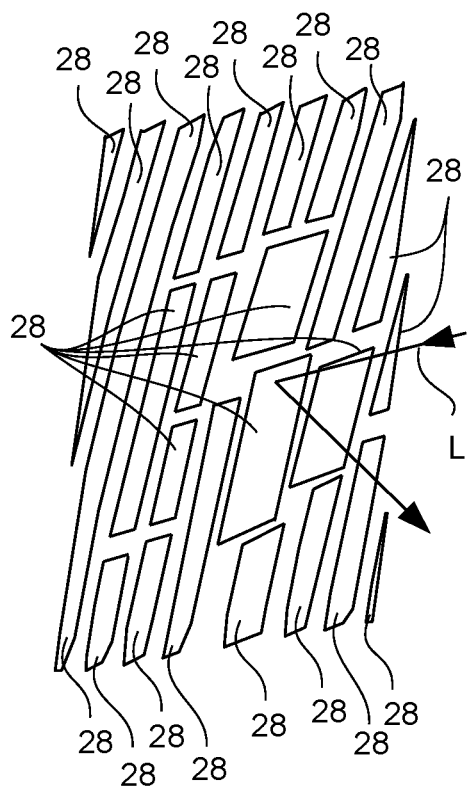
FIG. 10 is a schematic perspective representation of the optically active facets of the Fresnel structure according to a further embodiment.

In the embodiment shown in FIG. 9 the facets 28 are also formed in principle as elongate or strip-shaped facets 28. However, this is not essential. The facets 28 can have widely different shapes and also need not be arranged regularly, as is indicated in FIG. 10. Preferably, also in the representation according to FIG. 10, each of the facets 28 is in each case part of a predetermined surface, wherein the predetermined surfaces for the individual facets 28 differ in respect of their curvature profile. Because the facets 28 according to the embodiments from FIGS. 9 and 10 are smaller than the facets 28 according to FIG. 4, small aberrations per facet 28 will advantageously occur. Because, also, the number of facets 28 is higher, this can be used as a further degree of freedom in the optimization of the surfaces for the facets 28.

Figure 11:
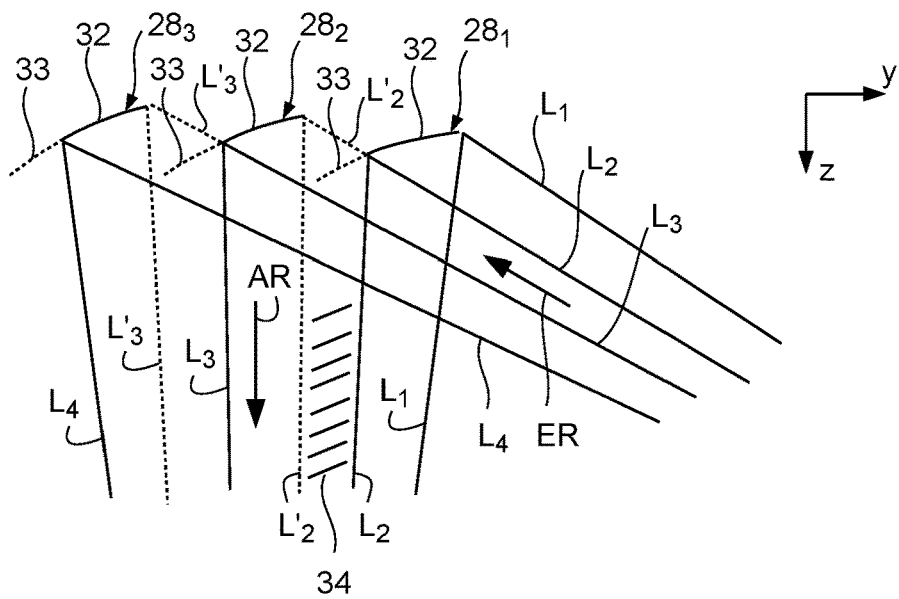
FIG. 11 is an enlarged sectional view according to FIG. 3 of three Fresnel segments of the Fresnel structure according to a further embodiment.

In FIG. 11 a modification of the optical element according to the invention is shown in a representation which corresponds to the representation according to FIG. 3. In this modification each reflective facet 28 has a first reflective section 32 and an adjoining second reflective section 33, wherein the reflectivity of the first reflective section 32 is greater than that of the second reflective section 33.

In the embodiment described here the first reflective section 32 for the light beams $L_1$-$L_4$ to be deflected can have as high as possible a reflectivity (for example 100%). The reflectivity of the second reflective section 33 can be e.g. 50%, with the result that 50% of the incident light is reflected and 50% is transmitted. This advantageously has the result that after the deflection by the Fresnel structure 21 there are as few as possible to no gaps between the deflected light beams $L_1$-$L_4$ and thus there is a homogeneous brightness distribution in the light bundle present through the deflected light beams $L_1$-$L_4$.

In the representation according to FIG. 11 three reflective facets 28 arranged next to each other (which are called first, second and third facets $28_1$, $28_2$ and $28_3$ here) are represented together with the corresponding light beams $L_1$-$L_4$. In addition, in each of the reflective facets $28_1$-$28_3$ the first reflective section 32 is shown with a continuous line and the adjoining second reflective section 33, which has a lower reflectivity, is represented as a dashed line.

As can be seen from the representation in FIG. 11, the second reflective section 33 of the first reflective facet $28_1$, viewed in the direction of incidence ER, lies in front of the first reflective section 32 of the second reflective facet $28_2$. This has the result that the light beam $L_2$, which strikes precisely the start of the second reflective section 33 of the first reflective facet $28_1$, is partially deflected by the second reflective section 33 in the direction of the direction of emergence AR and partially transmitted as the light beam $L_2'$. The transmitted light beam $L_2'$ strikes the first reflective section 32 of the second reflective facet $28_2$ lying behind the second reflective section 33 of the first reflective facet $28_1$ and is deflected by it in the direction of the direction of emergence AR. The area 34 represented shaded is thus also filled with deflected light beams 18, which would not be the case if the second reflective section 33 of the first reflective facet $28_1$ had no transmitting property, but was purely reflective. In this embodiment of the right-hand spectacle lens 3 the section (second reflective section 33) of the reflective facet 28 is thus formed partially reflective and partially transparent, which section would result in a shadowing of the reflective facet 28 lying behind in the predetermined direction of incidence ER. The undesired gaps after deflection can thus be prevented or filled with the correspondingly deflected light beams.

Furthermore, it is possible for the first reflective sections 32 not to be purely reflective, but to allow a certain transmittance. This can be utilized e.g. so that the surroundings can also be perceived by the user through the first reflective section 32 when the display device 1 is fitted on. The virtual image can in this case be represented superimposed with the surroundings.

Figure 12:
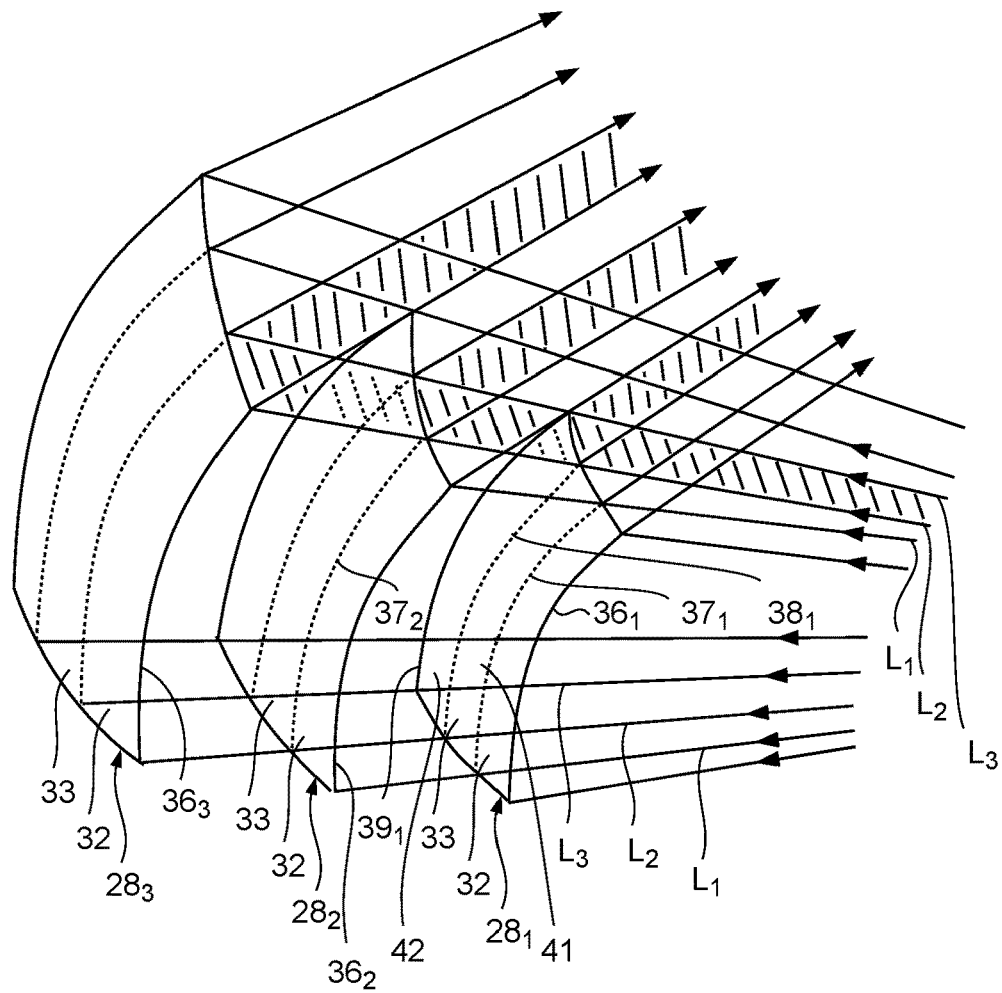
FIG. 12 is a schematic perspective view of a further embodiment of the optical element according to the invention.

A further embodiment of the right-hand spectacle lens 3 according to the invention is shown in perspective in FIG. 12 with three schematically represented reflective facets $28_1$, $28_2$ and $28_3$. The shape and position of the facets $28_1$-$28_3$ can be determined, for example, as follows. Light beams $L_1$ which strike the lower edge $36_2$ of the second facet $28_2$ determine the boundary or boundary line $37_1$ between the first reflective section 32 and the second reflective section 33 of the first reflective facet $28_1$. Light beams $L_2$ which strike the lower edge $36_3$ of the third facet $28_3$ determine the boundary or boundary line $37_2$ between the first and second reflective section 32 and 33 on the second reflective facet $28_2$ as well as an upper boundary or upper boundary line $38_1$ on the first reflective facet $28_1$.

Beams $L_3$ which are reflected at the lower edge $36_3$ of the third facet $28_3$ must touch the upper edge $39_1$ of the first facet $28_1$ and where possible have the same direction as the beams which are reflected on this upper edge $39_1$ of the first facet $28_1$. The part of the light beam L which is reflected by the upper partial area 42 of the second reflective section 33 of the first facet $28_1$ (shaded) must adjoin the part which is reflected by the first reflective section 32 of the second facet $28_2$. The upper partial area 42 of the second reflective section 33 is the area between an upper boundary $38_1$ and the upper edge $39_1$. The upper boundary $38_1$ is defined by the light beam $L_2$ which strikes the lower edge $36_3$ of the third facet $28_3$. The area between upper boundary $38_1$ and lower boundary $37_1$ can be called the lower partial area 41 of the second reflective section 33.

On the basis of these conditions it is possible to determine the shape and position of the facets 28 and the location of the boundaries 37, 38 for a light bundle or a light beam (e.g. for a central light bundle L). All facets 28 can be different for all boundary lines 37, 38. If all bundles from the object field are taken into account in this way, it can result in an alteration of the outlines of the facets 28 and the boundary lines. This can result in gaps and also in an inhomogeneous brightness distribution in the light after deflection. However, this is always much less than would be the case without the partially reflective sections 33.

The shaded area of entering light beams shows the distribution of the light on semi-transparent facet parts and the assembling to form a gap-free total bundle after deflection on the Fresnel structure 21.

Unlike in conventional Fresnel optical systems for spectacles with data reflection, in which the individual facets of the conventional Fresnel optical system consist of adjoining segments of a surface, in the Fresnel optical systems from the embodiment examples the facets can be formed from any segments of different surfaces, wherein the surfaces are described for example by polynomials with different coefficients. The facets can thus be chosen more freely and can be formed overlapping or spaced apart as desired in the beam path. The optical performance is thereby improved, for example the geometric-optical aberrations or beam deviations are reduced by at least 15%, preferably by 30%. At the same time the refractive power of the Fresnel surface can be increased, for example focal lengths of less than 5000 mm, preferably of less than 1000 mm are possible.

In the described embodiments of the display device 1 according to the invention the virtual image is coupled into the user's field of view via the right-hand spectacle lens 3. Of course, a coupling-in via the left-hand spectacle lens 4 is also possible. In addition, the display device 1 can be formed such that information is reflected via both spectacle lenses 3, 4. The reflection can take place such that a three-dimensional image impression forms.

The spectacle lenses 3 and 4 according to the described embodiments have an imaging effect with a refractive power of zero. Of course, the spectacle lenses 3, 4 can also have a refractive power not equal to zero and in particular can be designed to correct defective vision. The spectacle lenses 3, 4 can be produced e.g. from glass or from plastic.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. An optical element, comprising:
a Fresnel structure including several Fresnel segments, wherein each Fresnel segment has an optically active facet defining a shape, wherein the shape of each of the optically active facets is part of a separate predetermined surface that is optimized individually for each of the optically active facets to take into account which of a plurality of beams strike each of the optically active facets including whether shadows or misses occur for each beam of the plurality of beams, and wherein each of the predetermined surfaces of the optically active facets of each of the several Fresnel segments has a different curvature profile which precludes assembling of all of the optically active facets of the several Fresnel segments by reducing a parallel offset of the optically active facets until all of the optically active facets become connected end-to-end such that a surface is formed which is continuously differentiable,
wherein each optically active facet is formed as a reflective facet, and
wherein each of the optically active facets are connected to another adjacent one of the optically active facets by a side face spanning between the respective connected optically active facets.

2. The optical element according to claim 1, wherein each of the predetermined surfaces have no mirror or rotational symmetry.

3. The optical element according to claim 1, wherein each of the predetermined surfaces have no translational symmetry.

4. The optical element according to claim 1, wherein the Fresnel structure is formed on a boundary surface of the optical element.

5. The optical element according to claim 4, wherein the boundary surface is curved.

6. The optical element according to claim 1, wherein the Fresnel segments neighbour each other directly.

7. The optical element according to claim 1, wherein the Fresnel segments are spaced apart from each other.

8. The optical element according to claim 1, wherein the Fresnel structure provides an optical imaging function.

9. The optical element according to claim 1, wherein the optically active facets are arranged next to each other along a first direction and extend in the form of strips transverse to the first direction.

10. The optical element according to claim 1, wherein the optically active facets are arranged next to each other along a first direction and along a second direction running transverse to the first direction.

11. The optical element according to claim 1,
wherein the Fresnel structure is formed as a reflective Fresnel structure configured to deflect light bundles incident on the Fresnel structure along a direction of incidence into a direction of emergence,
wherein the optically active facets are arranged next to each other, and at least two directly neighboring facets include a first reflective section and an adjoining second reflective section,
wherein a reflective property of the first reflective section is greater than a reflective property of the second reflective section, and
wherein, viewed in the direction of incidence, the second reflective section of a first reflective facet lies in front of the first reflective section of the directly neighboring reflective facet, with the result that the part of the incident light bundle that is transmitted by the second reflective section of the first reflective facet strikes the first reflective section of the directly neighboring reflective facet, in order to be deflected.

12. The optical element according to claim 11, in which the second reflective section of the reflective facets includes in each case a first area which adjoins the first reflective section and a second area which adjoins the first area, wherein the second area of the first facet, viewed in the direction of incidence, lies in front of the first area of the directly neighboring facet.

13. The optical element according to claim 12, in which the reflectivity of the first area is greater than the reflectivity of the second area.

14. A method for producing an optical element according to claim 1, the method comprising:
a) providing an individual surface description for each of the optically active facets;
b) optimizing the shape of the surface characterized by the surface description for each optically active facet, in order to determine each respective one of the predetermined surfaces;
c) generating the production data on the basis of each of the thus-determined predetermined surfaces; and
d) producing the optical element on the basis of the production data.

15. The method according to claim 14, wherein in step c), for each of the optically active facets, the part of the determined predetermined surface which characterizes the optically active facet is arranged computationally on a curved base surface.

16. The optical element according to claim 1, wherein the optically active facets are arranged next to each other and aligned with a common axis, and wherein the optically active facets comprise a plurality of elongate strips that are longitudinally divided.

17. The optical element according to claim 1, the optically active facets comprise a plurality of elongate strips that are longitudinally divided.

18. A display device comprising:
an optical element comprising a Fresnel structure including several Fresnel segments, wherein each Fresnel segment has an optically active facet formed as a reflective facet and defining a shape, wherein the shape of each of the optically active facets is part of a separate predetermined surface that is optimized individually for each of the optically active facets to take into account which of a plurality of beams strike each of the optically active facets including whether shadows or misses occur for each beam of the plurality of beams, and wherein each of the predetermined surfaces of the optically active facets of each of the several Fresnel segments has a different curvature profile which precludes assembling of all of the optically active facets of the several Fresnel segments by reducing a parallel offset of the optically active facets until all of the optically active facets become connected end-to-end such that a surface is formed which is continuously differentiable, and wherein each of the optically active facets are connected to another adjacent one of the optically active facets by a side face spanning between the respective connected optically active facets,
a holder that can be fitted on the head of a user,
an image-generating module which generates an image and is secured to the holder, and
an imaging optical system which is secured to the holder and which has the optical element and images the generated image, when the holder is fitted on the head, such that the user can perceive it as a virtual image,
wherein the image generated by the image-generating module is coupled into the optical element via a coupling-in section of the optical element, guided in the optical element, by one or more reflections, to a coupling-out section and coupled out of the optical element via the coupling-out section, wherein at least one of the coupling-in and coupling-out section includes the Fresnel structure.

19. The optical element according to claim 18, wherein the optically active facets comprise a plurality of elongate strips that are longitudinally divided.

* * * * *